(12) United States Patent
Risbey et al.

(10) Patent No.: US 10,767,351 B2
(45) Date of Patent: Sep. 8, 2020

(54) PLUMBING FIXTURES (71) Applicant: Kohler Mira Limited, Gloustershire (GB)

(72) Inventors: Toby Risbey, Cheltenham (GB); Karl Fearnley, Cheltenham (GB); Ben Lea, Cheltenham (GB)

(73) Assignee: KOHLER MIRA LIMITED, Gloucestershire (GB)

( * ) Notice: Subject to any disclaimer, the term of this patent is extended or adjusted under 35 U.S.C. 154(b) by 10 days.

(21) Appl. No.: 16/318,920

(22) PCT Filed: Jul. 4, 2017

(86) PCT No.: PCT/GB2017/051964
§ 371 (c)(1),
(2) Date: Jan. 18, 2019

(87) PCT Pub. No.: WO2018/015709
PCT Pub. Date: Jan. 25, 2018

(65) Prior Publication Data
US 2019/0186109 A1    Jun. 20, 2019

(30) Foreign Application Priority Data
Jul. 21, 2016  (GB) .................................. 1612681.5

(51) Int. Cl.
*F16L 27/087* (2006.01)
*E03C 1/02* (2006.01)
(Continued)

(52) U.S. Cl.
CPC ............... *E03C 1/02* (2013.01); *E03C 1/021* (2013.01); *E03C 1/042* (2013.01); *F16K 19/006* (2013.01); *F16L 27/087* (2013.01)

(58) Field of Classification Search
USPC ...................................................... 137/625.4
See application file for complete search history.

(56) References Cited

U.S. PATENT DOCUMENTS 1,607,096 A * 11/1926 Mueller ................ F16L 27/093
                                                    285/127.1
2,782,800 A *  2/1957 Hillebrand ................ F16K 3/26
                                                    137/625.38
(Continued)

FOREIGN PATENT DOCUMENTS

GB       2457007       8/2009
WO    WO2011/135345    11/2011

OTHER PUBLICATIONS

International Search Report re Application No. PCT/GB2017/051964; 3 pages.

*Primary Examiner* — John Fox
(74) *Attorney, Agent, or Firm* — Foley & Lardner LLP (57) ABSTRACT

A mixer valve (1) having a body (2) and adapted to be connected to two fluid supplies. The mixer valve (1) has at least one connector (6) comprising a housing (8); a fluid delivery tube (10) within the housing, the fluid delivery tube (10) having at least one aperture (22); a slider (16) arranged around and slideable over the delivery tube (10) and having an interior chamber (18) in fluid communication with an interior (20) of the delivery tube by means of the at least one aperture (22); and a fluid inlet (14) connected to the slider (16) at an angle thereto, the fluid inlet (14) being connectable to a fluid supply pipe. The fluid inlet (14) is in fluid communication with the chamber (18), and the housing (8) has an external opening (12) within which the fluid inlet (14) is located and movable.

13 Claims, 8 Drawing Sheets

(51) Int. Cl.
*E03C 1/042* (2006.01)
*F16K 11/00* (2006.01)

(56) References Cited

U.S. PATENT DOCUMENTS

| | | | | |
|---|---|---|---|---|
| 4,635,678 | A * | 1/1987 | Peterman | F16K 3/265 137/551 |
| 4,742,849 | A * | 5/1988 | Prudhomme | F15B 11/042 137/513.7 |
| 9,568,109 | B2 * | 2/2017 | McHugh | F16K 1/12 |
| 2004/0144944 | A1 * | 7/2004 | Roethel | F16K 3/265 251/240 |
| 2012/0151669 | A1 * | 6/2012 | Wilson | F16K 11/085 4/615 |
| 2013/0340162 | A1 | 12/2013 | Peel | |

* cited by examiner

PLUMBING FIXTURES

CROSS-REFERENCE TO RELATED PATENT APPLICATIONS

This application is a U.S. National Stage of International Application No. PCT/GB2017/051964, filed Jul. 4, 2017, which claims priority to and the benefit of Great Britain Patent Application 1612681.5, filed Jul. 21, 2016, each of which is incorporated herein by reference in its entirety.

BACKGROUND

This invention relates to plumbing fixtures and particularly to faucets. Invention has particular, but not exclusive, application to mixer valves such as may be used for shower systems.

A mixer valve may have separate inlets for connection to supplies of hot and cold water and may have an outlet for connection to a showerhead such as a handset or a spray head.

When a mixer valve is fitted in a new installation, the location and spacing of the hot and cold water supply pipes can be adjusted and arranged to be suitably spaced for connection to the hot and cold water inlets of the mixer valve. However, when replacing a mixer valve in an existing installation, problems can arise if the spacing of hot and cold water supply pipes is not the same as the spacing between the hot and cold inlets of the new mixer valve.

In the past this problem has been addressed by supplying the mixer valve with inlets that can be screwed into bosses on the body of the valve wherein the screw threaded engagement between inlets and the bosses allows the spacing between inlets to be adjusted to a small degree.

An alternative solution has been to provide inlets that are telescopic to allow the spacing between the inlets to the adjusted. This approach has improved the aesthetic appearance but the adjustment that can be provided is limited as the sliding portion of the inlets must be able to seal at both ends.

An additional problem that can arise when replacing a mixer valve in an existing installation is that the projection of the water supply pipes from the mounting surface may not be suitable for connection to the inlets of the new mixer valve. It may be that the pipes project to a distance from the mounting surface which is too great or too small to mount the new mixer valve without altering a projection length of the supply pipes. Such changes to the supply pipes may be difficult, especially when connecting the new mixer valve to existing compression fittings.

It is also desirable to provide a mixer valve which can be connected to a multiplicity of inlet supplies.

An object of the invention is to overcome or at least to mitigate the aforementioned problems and disadvantages.

SUMMARY

According to a first aspect of the invention there is provided a mixer valve having a body and adapted to be connected to two fluid supplies wherein the mixer valve has at least one connector comprising a housing; a fluid delivery tube within the housing, the fluid delivery tube having at least one aperture; a slider arranged around and slidable over the delivery tube and having an interior chamber in fluid communication with an interior of the delivery tube by means of the at least one aperture; a fluid inlet connected to the slider at an angle thereto, the fluid inlet being connectable to a fluid supply pipe; the fluid inlet being in fluid communication with the chamber, and wherein the housing has an external opening within which fluid inlet is located and movable.

This arrangement enables a mixer valve having at least one connector, to be connected to fluid supply pipes having a variety of different spacings and/or alternative orientations such as rear fed inlets, falling inlets, and rising inlets.

Desirably the mixer valve can be adjusted to be connected to supply pipes having a variety of spacings. By way of non-limiting example, spacing may be from 80 mm to 200 mm or more preferably from 90 mm to 180 mm or more preferably still from 100 mm to 160 mm. In a preferred embodiment the spacing may be from 108 mm to 155 mm.

Preferably the slider comprises a generally cylindrical body having a port which is arranged to connect to the fluid inlet.

In a preferred embodiment the interior chamber is formed between an interior surface of the cylindrical body and an exterior surface of the fluid delivery tube.

Desirably the slider further comprises inner and outer seals arranged to make a sealing connection between the body of the slider and the exterior surface of the fluid delivery tube.

Desirably the fluid inlet is connected to the slider at substantially 90° at the port. In a preferred embodiment the fluid inlet comprises a nipple and the nipple is keyed to the slider. The fluid inlet may be keyed to the slider by means of cooperating profiles between the nipple and the port and/or location lugs. Desirably the connection between the fluid inlet and the port is arranged to prevent rotation of the fluid inlet relative to the slider. A secure anti-rotational connection between the fluid inlet and the slider improves the strength of the installation and the connection between the connector and a supply pipe to which the fluid inlet is to be connected.

In some embodiments the fluid inlet may also be connected to the slider by means of a bolt. The bolt may be centrally located within the fluid inlet.

Desirably a fluid seal is provided around a joint between the fluid inlet and slider so sealing the joint against fluid egress from the port.

Desirably the external opening in the housing is arranged to extend a distance such that the fluid inlet can move freely within the opening between a maximum and a minimum adjustment. In some embodiments the opening is curved and may preferably be provided with at least a partial up-stand.

In a preferred embodiment the external opening is closable. Desirably a removable covering is provided which can be fitted to the up-stand so closing the external opening in the connector. In a preferred embodiment the covering is adapted to be able to be cut or trimmed such that the covering can be fitted to the opening at any location of the fluid inlet within the opening. The covering can be used to close the opening for any supply pipe spacing. The covering may be provided with predefined cutting points or frangible lines. The covering may be used to close both side portions of the opening if the fluid inlet is positioned mid-way along the opening. Desirably the covering may be cut such that a first part covers one side of the opening and a second part covers a second side of the opening.

The connector may comprise a first end and a second end. The first end is connectable to a mixer valve or may in some cases be integral with a mixer valve. Preferably the second end is provided with a cap arranged to close the second end.

The delivery tube desirably also comprises a first end and a second end. The first end is preferably in fluid communication with the mixer valve. In a preferred embodiment the second end may be provided with a threaded connection. Desirably the threaded connection is internally located in the delivery tube.

The delivery tube further comprises at least one aperture. In some embodiments the aperture may extend partially around a circumference of the delivery tube. In other embodiments a number of apertures may be provided, each extending partially around the circumference of the delivery tube.

In a preferred embodiment the delivery tube comprises a coupling portion adapted to be connectable to the mixer valve. The delivery tube may have a coupling portion adapted and arranged to connect to a port in a mixer valve. The coupling portion desirably has a retainer arranged to secure the coupling portion to the mixer valve. Desirably the coupling portion is arranged fit within a port in the mixer valve assembly. Desirably the connector additionally comprises an end section adapted to interact with a valve mixer. A sealing ring may be provided between the coupling portion and the end section of the connector in order to fluidly seal the coupling portion.

Desirably the coupling portion and the end section of the connector are arranged to allow 360° rotation of the connector relative to a mixer valve to which the connector can be connected in use.

Optionally a filter may be provided within the delivery tube. The filter may comprise a filter housing and a filter mesh located within the housing. In some embodiments the filter housing may be cylindrical and the filter mesh may be located and supported within a cylindrical frame provided by the housing.

Desirably fluid can flow from the chamber and through the aperture in the delivery tube and thence through the filter mesh into the interior of the delivery tube.

Desirably the filter is connected to a filter cap. In some preferred embodiments the filter cap is threadably connected to the delivery tube. Preferably the filter cap is securely located within the delivery tube.

The filter cap may also be connectable to the end cap provided on the housing. Desirably the end cap and the filter cap are removable allowing the filter to be serviced or replaced. One or more pressure tee off points may also be provided.

Desirably the chamber is arranged to encircle the delivery tube. The slider comprises a chamber adjacent to the delivery tube and an aperture is provided in the slider for communication with the fluid inlet. Preferably the chamber is unitary and encircles the delivery tube. Water flowing in from the inlet supply can flow through the chamber to the aperture or apertures in the delivery tube and from thence can flow through the filter and the delivery tube to the mixer valve.

Preferably the slider further comprises a seal or a number of seals arranged to provide a fluid seal between the slider and an outer surface of the delivery tube.

Preferably the slider is pressure balanced for ease of use and may be arranged to hold itself in place once it has been installed within the connector and around the delivery tube.

Desirably the slider is arranged to allow a range of movement. By way of non-limiting example, the slider may allow movement of from 10 mm to 40 mm, or more preferably from 15 mm to 30 mm, or more preferably still from 20 mm to 25 mm. In one preferred embodiment a range of movement of 23.5 mm may be possible.

Preferably the relative arrangement of the slider and the aperture in the delivery tube is such that when the slider is arranged to be adjacent the second end of the connector an inner end of the slider is adjacent to but does not cover an inner side of the aperture. An outer end of the slider is preferably adjacent to the cap. The fluid inlet is desirably located at an outermost location when the slider is adjacent the second end. Preferably when the slider is arranged to position the fluid inlet at an innermost location the outer end of the slider is adjacent to but not covering an outer side of the aperture in the delivery tube.

Desirably the mixer valve comprises two ports each having an adjustable connector.

In a desired embodiment the mixer valve comprises a body having inlet ports on opposing sides thereof. The mixer valve is preferably arranged to be mounted on a mounting surface. Desirably fluid supply pipes project from the mounting surface.

In use the fluid inlets of the adjustable connectors are arranged to be connected to the fluid supply pipes projecting from the mounting surface.

In a preferred embodiment the mixer valve may further comprise a number of spacers which may be connected to the body of the mixer valve assembly in order to adjust a depth between a distal end of the or each fluid inlet and the mounting surface. Desirably the spacers are arranged to provide a connection range of from 3 mm to 20 mm or more preferably from 5 mm to 20 mm or most preferably from 7 mm to 15 mm. A desired number of spacers may be selected to provide the desired depth from the distal end of the or each fluid inlet and the mounting surface. In an alternative embodiment a range of spacers having different thicknesses may be used. It may be desirable to use a combination of variable thicknesses and a selected number of spacers to achieve the desired depth from the distal end of the or each fluid inlet and the mounting surface.

Preferably the mixer valve further comprises a chrome spacer plate arranged encircling and slidable over the body of the mixer valve. Desirably the chrome spacer plate may be used to cover the spacers used to achieve the desired depth from the mounting surface and provide a suitable aesthetic appearance.

According to a second aspect of the invention, there provided a mixer valve having a body and two inlets for connection to respective fluid supplies, wherein at least one inlet is moveable towards and away from the other inlet for varying a distance between the inlets.

BRIEF DESCRIPTION OF THE DRAWINGS

The invention will now be further described by way of example only with reference to the accompanying drawings in which.

DETAILED DESCRIPTION

Figure 1:
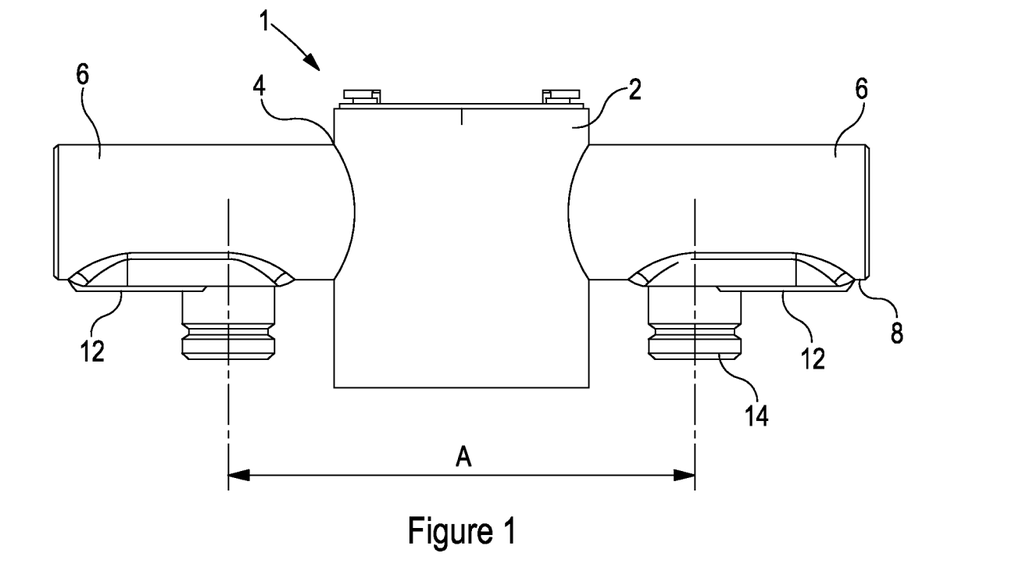
FIG. 1 is a mixer valve in accordance with the invention and arranged to be fitted to rear mounted supply pipes having a relatively narrow spacing.

FIG. 1 illustrates a mixer valve 1 in accordance with the invention and comprising a body 2 having two ports 4 located on opposing sides of the body and an adjustable connector 6 connected to each port 4 and extending outwardly from the mixer valve body 2. Each connector 6 comprises a housing 8 in which a fluid delivery tube or pipe 10 (see FIG. 4) is located. The housing 8 has an external opening 12 within which a movable fluid inlet 14 is located. In FIG. 1 the fluid inlets 14 are positioned within the respective external openings 12 such that a spacing 'A' between the fluid inlets is relatively narrow. In this embodiment the spacing A can be adjusted so that the mixer valve can be connected to supply pipes having a spacing from 108 mm to 155 mm.

Figure 2:
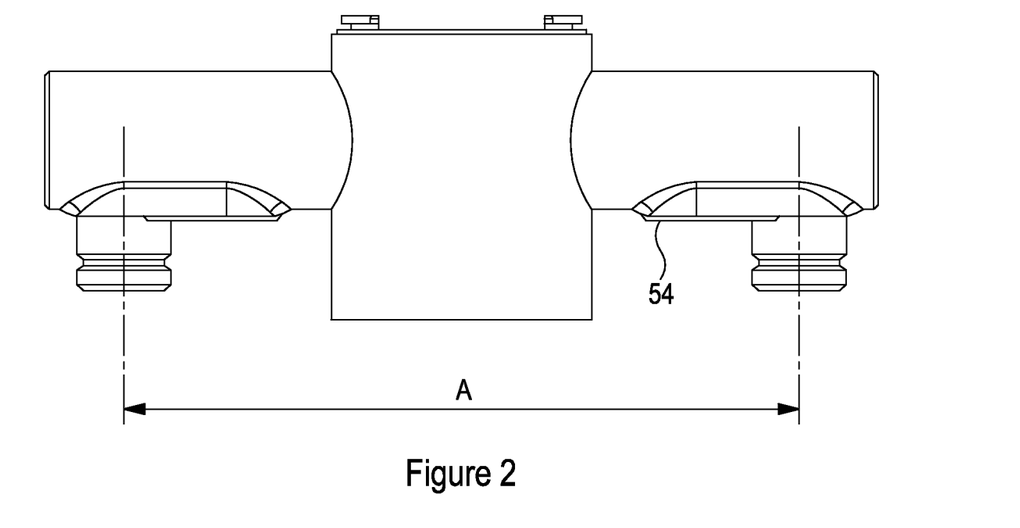
FIG. 2 is a plan view of the mixer valve of FIG. 1 arranged to be fitted to a rear mounted supply pipes having a relatively wider spacing.

FIG. 2 illustrates the mixer valve 1 of FIG. 1 in which the spacing A between the fluid inlets 4 is relatively wide.

Figure 3A:
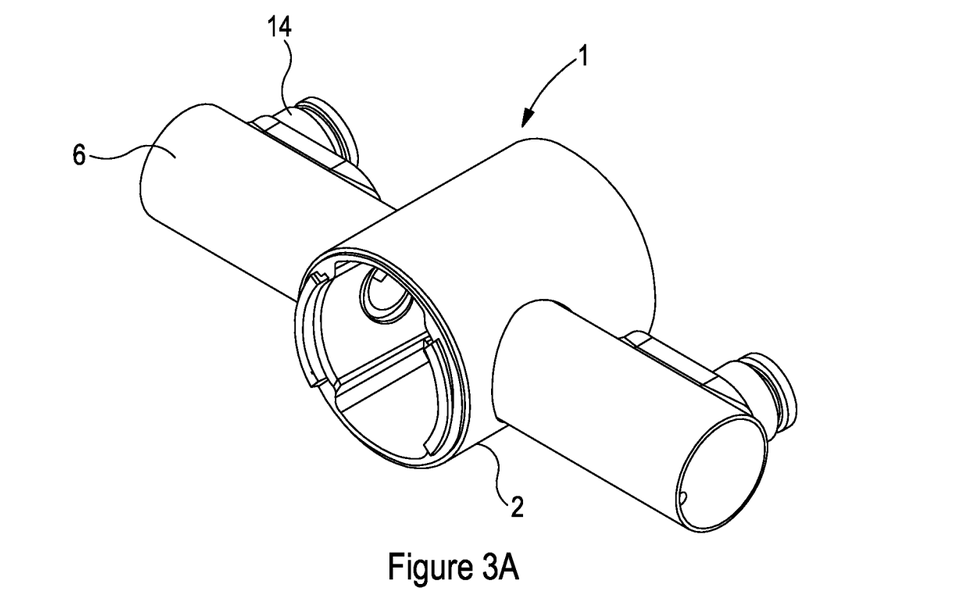
FIG. 3A, 3B and 3C illustrates arrangements of the mixer valve to be connected to rear fed inlet pipes, falling inlet pipes and rising inlet pipes respectively.
Figure 3B:
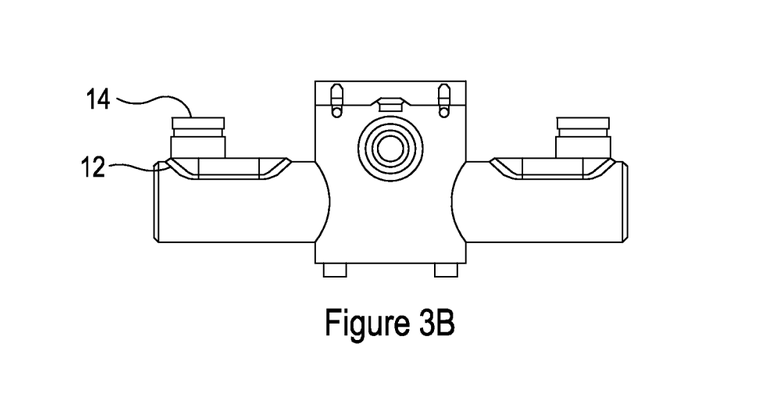
Figure 3C:
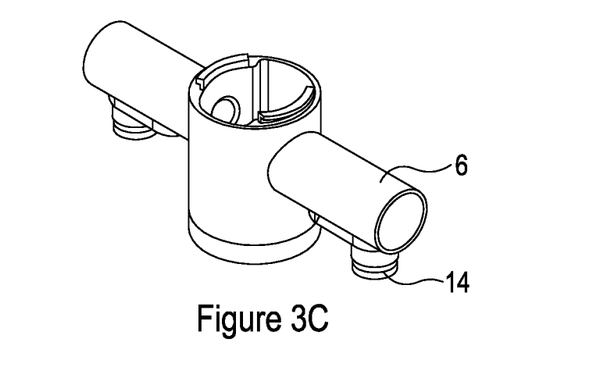

FIG. 3A, 3B and 3C schematically illustrates how a mixer valve 1 in accordance with the invention can be utilized for connection with rear fed inlet pipes (not shown), falling inlet pipes and rising inlet pipes. The connector 6 can be rotated by 360° at the connection between the body 2 of the mixer valve 1 and the connector 6 so allowing flexibility in the connection to a fluid supply pipes. It will be appreciated that the mixer valve 1 can accommodate a variation in spacing of fluid inlet pipes for each of these orientations, or indeed an offset orientation.

Figure 4:
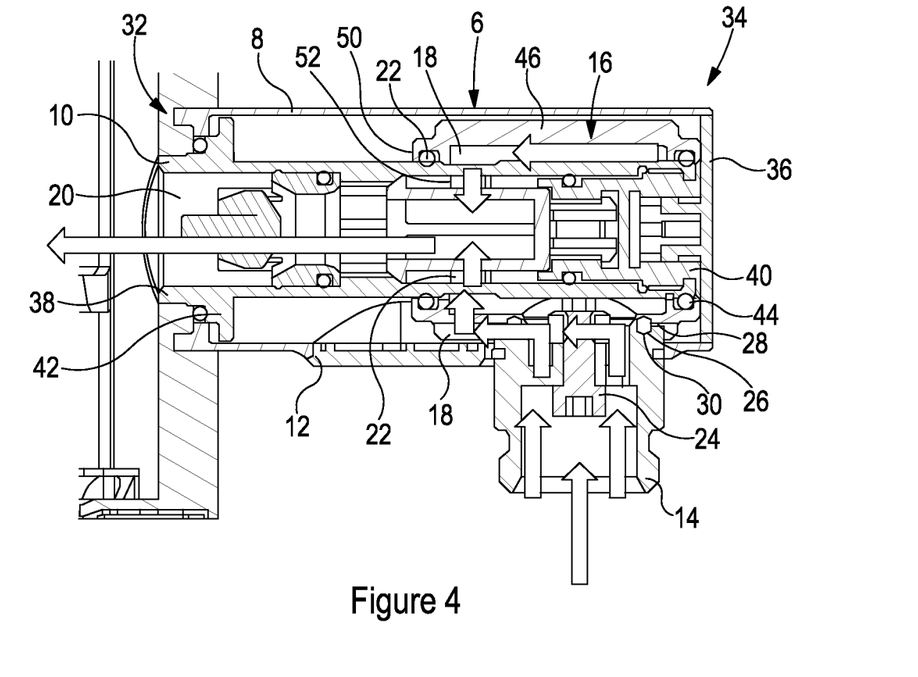
FIG. 4 is a cross section of an adjustable connector with a slider in a first position.

Turning now to FIG. 4, this Figure shows a cross section of a connector 6 extending from the mixer valve. The connector 6 comprises the housing 8, the fluid delivery tube 10 within the housing 8 and a slider 16 arranged around and slidable over the delivery tube 10. The slider 16 has an interior chamber 18 which is in fluid communication with an interior 20 of the delivery tube 10 by means of a number of apertures 22 each of which extends partially around a circumference of the delivery tube. The connector 6 further comprises a fluid inlet which is connected to the slider at substantially 90°. The fluid inlet 14 is in fluid communication with the interior chamber 18 inside the slider 16 and furthermore is adapted to be connected to a fluid supply pipe which may be mounted in a wall or other mounting surface. As described earlier the housing 8 of the mixer valve comprises an external opening 12 within which the fluid inlet 14 is located and within which a position of the fluid inlet 14 can be adjusted as desired.

The fluid inlet 14 is connected to the slider 16 by means of an internal bolt 24 and further by interacting cooperating profiles generally indicated at 26. In this embodiment the fluid inlet 14 is a nipple and is connected to the slider 16 around a port 28 in the slider. The cooperating profiles 26 of the nipple 14 and the slider 16 are such that rotation of the nipple 14 relative to the slider 16 is prevented. A fluid seal 30 is provided around the connection between the nipple and the port 28 and seals the joint against fluid leaking from the inlet or the slider.

The external opening 12 in the housing 8 will be described in more detail below but is arranged to extend a distance such that the nipple 14 can move freely within the opening 12 between a maximum and a minimum adjustment so allowing the valve mixer to be connected to inlet supply pipes which may have variable spacings A.

The connector 6 has a first end 32 and a second end 34. The first end 32 is connected to the mixer valve body 2 by means of a coupling which will be described more detail below. The second end 34 of the connector 6 is provided with a cap 36 arranged to close the second end 34.

The delivery tube 10 is located within the connector housing 8 and also comprises a first end 38 and a second end 40. The first end 38 is formed into a coupling portion 42 which engages the mixer valve body 2 and secures the connector 6 to the mixer valve 1. The second end 40 of the delivery tube 10 has an internal threaded connection 44.

The delivery tube 10 comprises a number of apertures 22 which each extend partially around a circumference of the delivery tube 10.

The slider 16 comprises a generally cylindrical body 46 in which the port 28 is arranged to be connected to the fluid inlet 14. The slider 16 has an interior chamber 18 formed between an interior surface of the cylindrical body and an exterior surface of the fluid delivery tube. The cylindrical body extends to an internal wall of the housing of the connector and is slidable within the wall. The slider further comprises inner and outer seals which provide a sealing connection between the body of the slider and the exterior surface of the fluid delivery tube.

The chamber 18 is arranged to encircle the delivery tube 10 and to remain in fluid communication with the apertures 22 in the delivery tube. The slider 16 is arranged to allow movement in this embodiment of about 23.5 mm. The slider 16 is also pressure balanced and this ensures that the slider holds itself in position once it is installed in position on the fluid supply pipes.

In FIG. 4 the slider 16 is in an outer positon in which the slider is arranged to be adjacent the second end 34 of the connector and an outer end 48 of the slider is in contact with the end cap 36 of the connector housing 8. In this position an inner end 50 of the slider is adjacent to but does not extend over an inner side 52 of the aperture 22 in the delivery tube 10.

Once connected to a fluid supply pipes the fluid can enter through the nipple 14 and thence from the nipple 14 into the chamber 18 of the slider. Fluid can flow freely around the chamber 18 and can move into the delivery tube 10 through the apertures 22.

Figure 5:
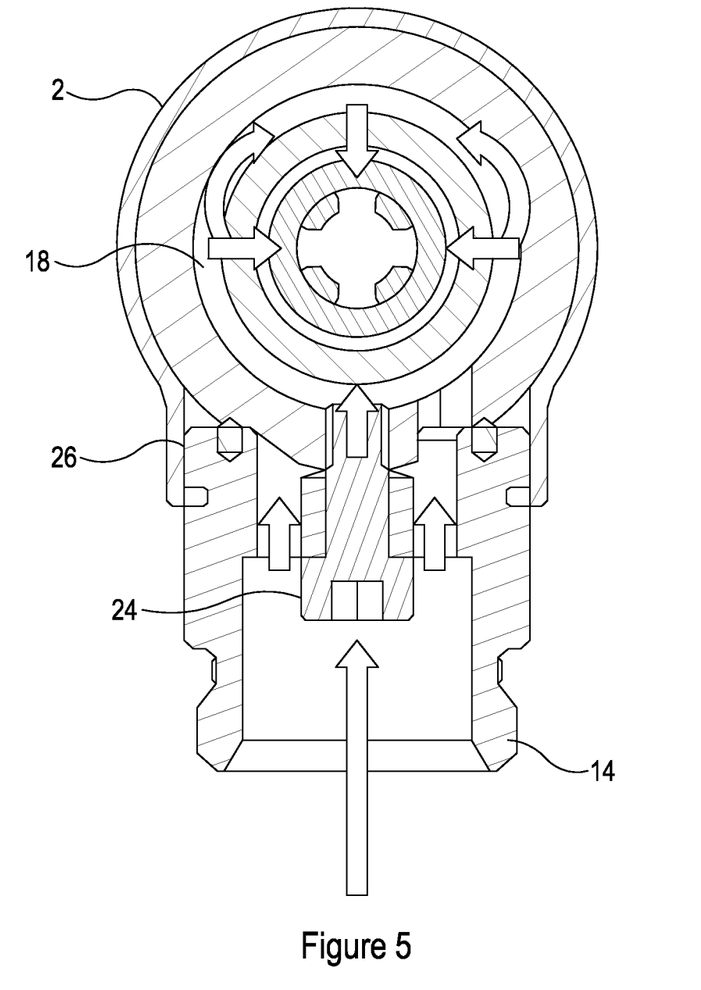
FIG. 5 is a cross section along the line X-X in FIG. 4.

In this embodiment the delivery tube 10 is provided with four apertures 22 each extending partially around a circumference of the delivery tube. Flow of fluid from the nipple 14 to the delivery tube is substantially evenly around the delivery tube and fluid can flow through each of the four apertures 22 as is illustrated in FIG. 5.

Figure 6:
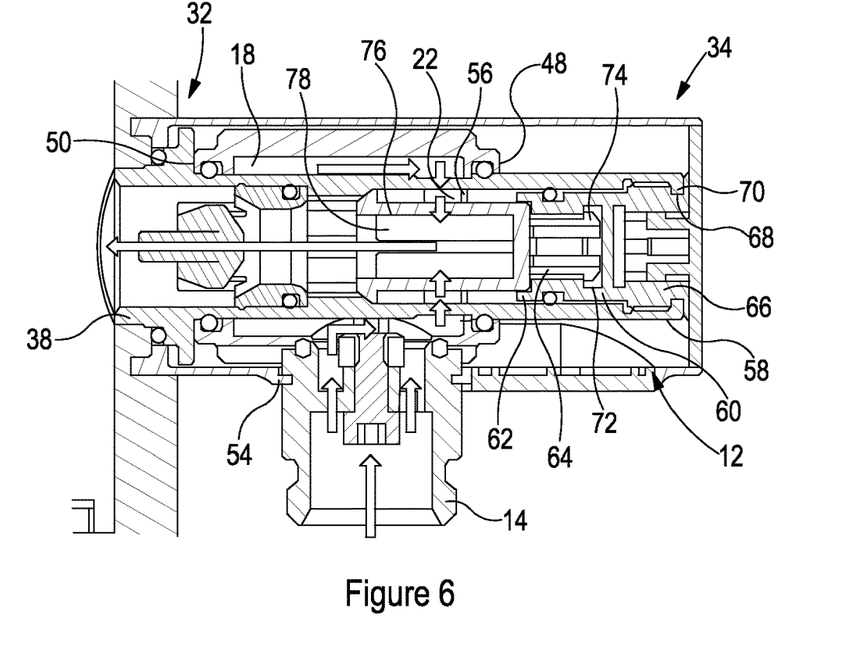
FIG. 6 is a cross section with the slider in a second position.

FIG. 6 illustrates the arrangement of the fluid inlet 14 and the slider 16 when the slider is located at its innermost extremity in the external opening 12. In this position the nipple 14 is in contact with an inner end 54 of the external opening 12. The outer end 48 of the slider is adjacent to but does not cover an outer side 56 of the aperture in the delivery tube. The inner end 50 of the slider moves towards the mixer valve body 2. In this position fluid can flow through the nipple 14 and into the chamber 18 of the slider and as before can flow around the interior chamber and through the four apertures 22 into the delivery tube.

The connector 6 further comprises a filter cap 58 which comprises a cylindrical body 60 inserted within the delivery tube. The cylindrical body 60 comprises a first end 62 arranged to be removably connected to a filter 64 and a second end 66 adapted to connect to the delivery tube and to the end cap 36 of the connector 6. The second end 66 of the cylindrical body 60 has an external threading 68 which is arranged to cooperate with the internal thread 44 on the delivery tube to secure the filter cap body 60 in position within the delivery tube 10. The second end 66 of the cylindrical body additionally has a recess 68 arranged to cooperate with and to secure fixing means 70 provided on an internal side of the end cap 36 of the connector. The first end 62 of the cylindrical body has a chamber 72 arranged to receive and secure fixing means 74 provided on the filter.

The end cap 36 can be removed from the connector 6 and the cylindrical body 60 can be removed from the interior of the delivery tube by unscrewing the cylindrical body 60 and removing it. As the filter cap body is removed the filter 64 is extracted from the delivery tube and can be readily serviced or replaced and the filter cap 58 and filter 64 can then be reintroduced into the delivery tube. The arrangement of the filter cap 58 is such that it may also be used for the provision of pressure tee off points. The filter 64 comprises supports 76 and a mesh 78 extending between the supports 76.

Figure 7:
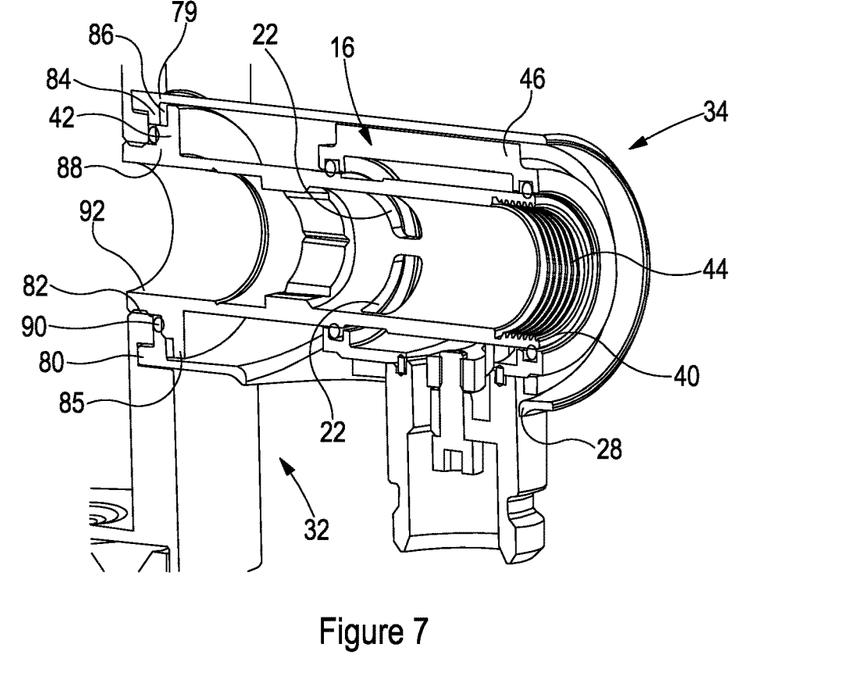
FIG. 7 is a longitudinal section through the connector.

FIG. 7 illustrates a partial cross-section through the connector housing 6 and the delivery tube 10. The internal threading 44 of the delivery tube can be readily seen at the second end 34 of the delivery tube. The apertures 22 in the delivery tube each extend partially around a circumference of the delivery tube. An internal stop section 78 is provided which is arranged to support the filter 64 in use. A first end of the delivery tube forms the coupling 42 which is adapted to be connected to the mixer valve body 2. The housing of the connector has an end extension 79 arranged to extend into a circular slot 80 provided in the mixer valve. The circular slot 80 encircles a port 82 in one side of the mixer valve 2. A stepped portion 84 of the housing extends inwardly adjacent to the first end 32 of the connector housing.

The coupling portion 42 of the delivery tube is arranged to have an outwardly extending flange 85 which seals against a washer 86 provided between the outwardly extending flange 85 and the stepped portion 88 of the connector housing 6. A further seal 90 is provided between the body of the mixer valve and the flange 84 of the coupling portion 42. An insert portion 92 of the coupling portion is arranged to fit within and seal to the port 82 in the body of the mixer valve. Further retaining means may be provided to secure the coupling portion 42 to the mixer valve. Such retaining means are well known in the art.

The coupling portion and the end extension 79 of the housing 8 are arranged to be rotatable within the slot 80 and the port such that the connector 6 can be rotated through 360°.

Figure 8:
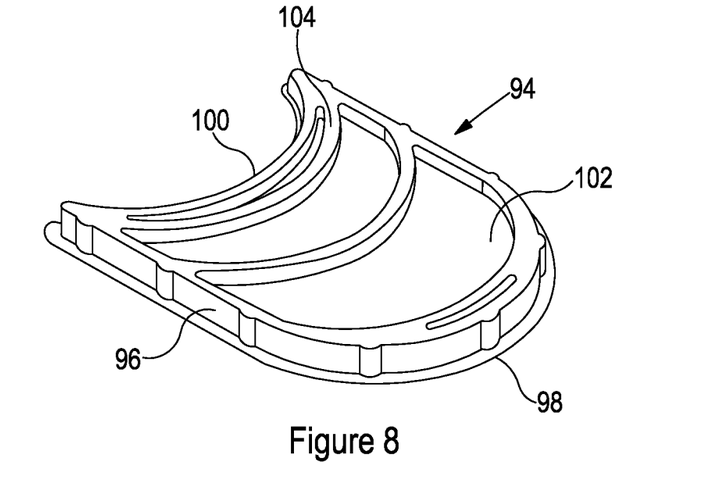
FIG. 8 is view of a cover for an opening in the connector.
Figure 9A:
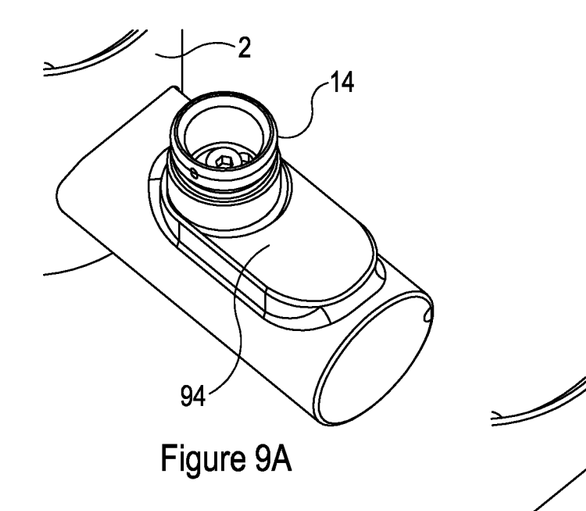
FIGS. 9A, and 9B are views of the cover in use.
Figure 9B:
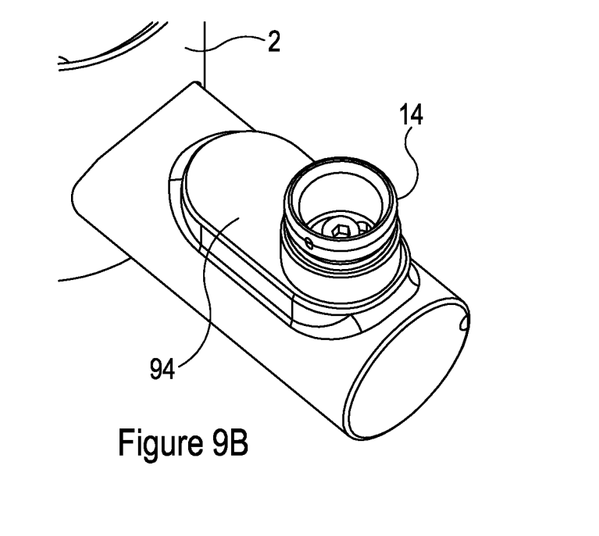

FIG. 8 illustrates a cover 94 which may be used over the external opening 12 of the connector. The cover 94 comprises a straight section 96 and an outwardly curved end section 98. The cover 94 also comprises an inwardly curved end section 100. The cover 94 may be used to close the exterior opening 12 in the elbow assembly when the fluid inlet 14 is located in either the innermost or the outermost position as shown in FIGS. 9A and FIG. 9B.

An inner side 102 of the cover may have a number of arcuately extending reinforcing ridges 104. The cover may be trimmed along the lines of one of these reinforcing ridges in order to provide two sections of the cover which may be used to close over each side of the external opening when the fluid inlet is in an intermediate position.

Figure 10:
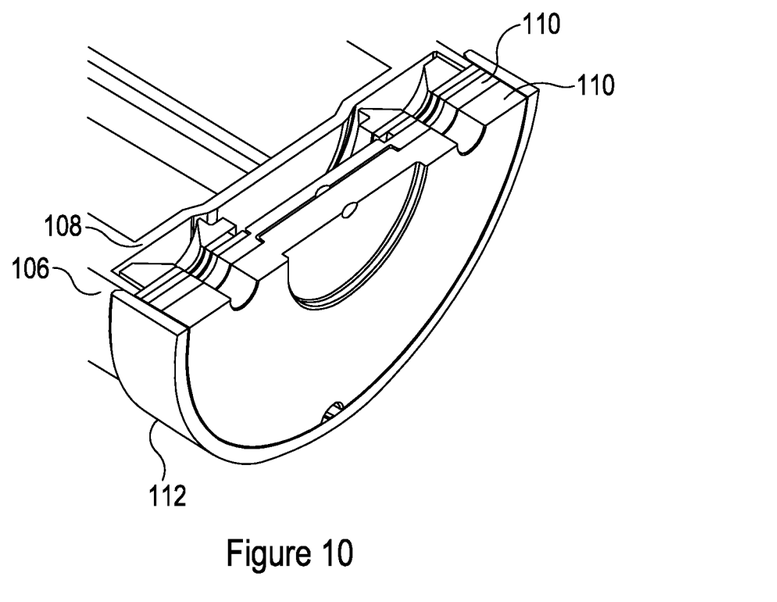
FIG. 10 is a partial cross sectional view of the mixer valve with spacers.
Figure 11:
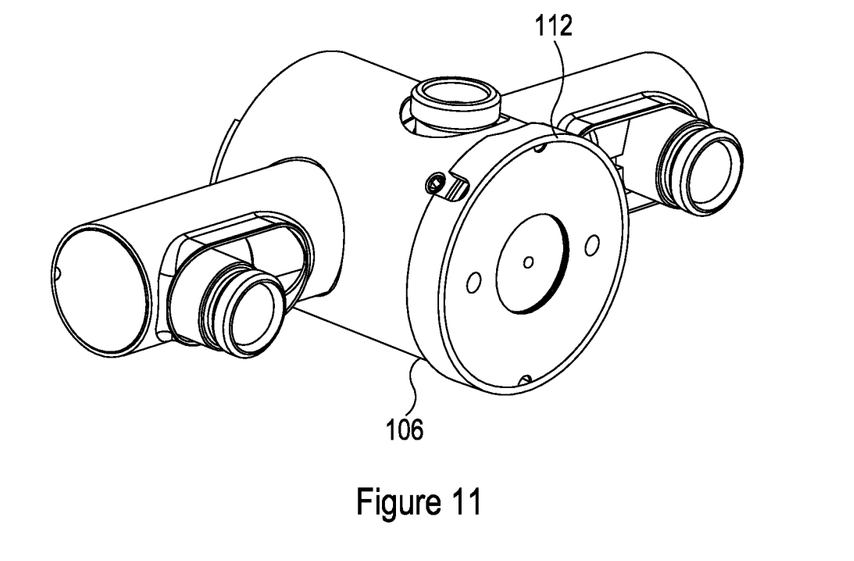
FIG. 11 is a perspective view of the mixer valve of FIG. 10.
Figure 12:
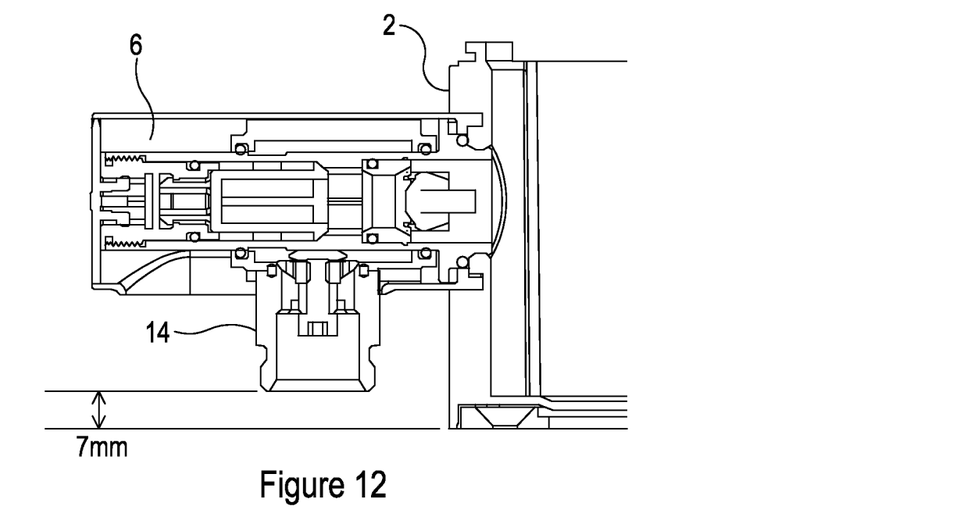
FIG. 12 is a cross sectional view of the mixer valve with the connector arranged for a narrow inlet spacing.
Figure 13:
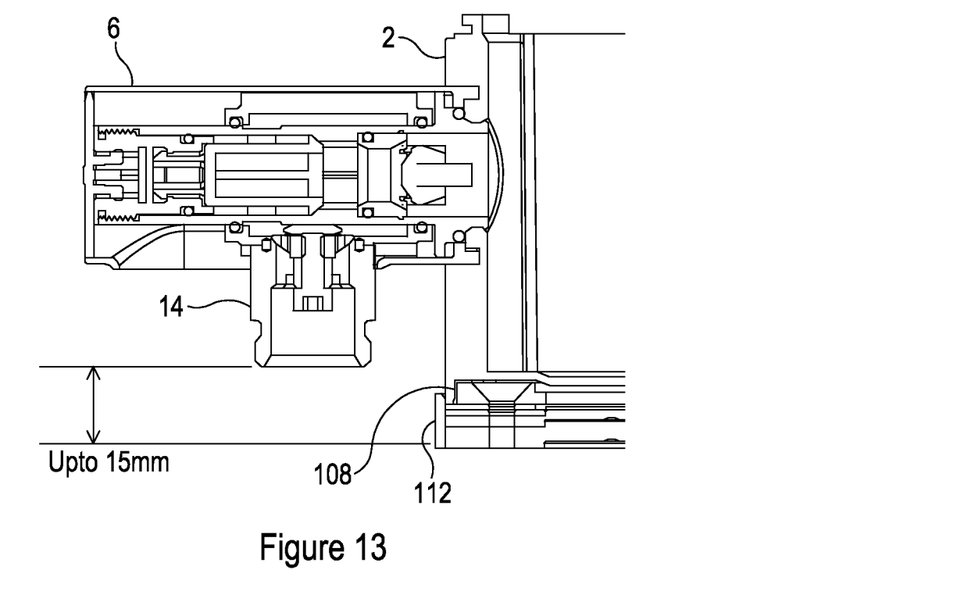
FIG. 13 is a cross sectional view of the mixer valve with the connector arranged for a relatively wider inlet spacing.

FIG. 10 illustrates a partial cross-section of a mounting portion of the mixer valve 1. The mounting portion comprises a base 106 having a recess 108 and to which a number of spacers 110 can be connected. Each spacer 110 has a substantially circular diameter and has a thickness. A number of spacers can be provided having different thicknesses, for example 1 mm, 2 mm, and 4 mm. By choosing a suitable number and combination of spacer thicknesses a depth from a mounting surface can be varied. By way of non-limiting example, the depth may be adjusted from 1 mm to 8 mm. A chrome spacing plate 112 is provided on the body of the mixer valve and can be slid into place over the spacers in order to provide a more aesthetic appearance. Varying the distance of the mixer valve from the mounting surface provides an adjustable distance between the mounting surface and the fluid inlet 14. By way of non-limiting example, the distance may be adjusted from 7 mm up to 15 mm. Accordingly, the mixer valve is able to provide flexibility in adjusting for both a distance of the inlet supply from the mounting surface and also a distance between inlet supply pipes such as hot and cold water supplies. The spacers form the subject matter of our co-pending UK patent application of even date and are not described further herein.

The invention claimed is:

1. A mixer valve adapted to be connected to two fluid supplies and having at least one connector comprising:
   a housing;
   a fluid delivery tube within the housing, the fluid delivery tube having at least one aperture extending partially around a circumference of the fluid delivery tube;
   a slider arranged around, and slideable over, the delivery tube, the slider having an interior chamber in fluid communication with an interior of the delivery tube by the at least one aperture; and
   a fluid inlet connected to the slider at an angle thereto, the fluid inlet being connectable to a fluid supply pipe and in fluid communication with the chamber;
   wherein the housing has an external opening within which the fluid inlet is located and movable.

2. The mixer valve of claim 1, wherein the slider comprises a generally cylindrical body having a port which is arranged to connect to the fluid inlet.

3. The mixer valve of claim 2, wherein the interior chamber is formed between an interior surface of the cylindrical body and an exterior surface of the fluid delivery tube.

4. The mixer valve of claim 3, wherein the slider further comprises inner and outer seals arranged to make a sealing connection between the body of the slider and the exterior surface of the fluid delivery tube.

5. The mixer valve of claim 2, wherein the fluid inlet is connected to the slider at substantially 90° at the port.

6. The mixer valve of claim 1, wherein the connection between the fluid inlet and the port is arranged to prevent rotation of the fluid inlet relative to the slider.

7. The mixer valve of claim 1, wherein a fluid seal is provided around a joint between the fluid inlet and the slider.

8. The mixer valve of claim 1, wherein the external opening in the housing is arranged to extend a distance such that the fluid inlet can move freely within the opening between a maximum and a minimum adjustment.

9. The mixer valve of claim 1, wherein the delivery tube comprises a coupling portion adapted to be connectable to the mixer valve.

10. The mixer valve of claim 9, wherein the coupling portion is configured to allow 360° rotation of the connector relative to the mixer valve.

11. The mixer valve of claim 1, further comprising a filter within the fluid delivery tube.

12. The mixer valve of claim 1, wherein the slider is pressure balanced.

13. The mixer valve of claim 1, wherein the mixer valve comprises two ports each having an adjustable connector.

* * * * *